(12) United States Patent
Britt

(10) Patent No.: US 6,837,528 B1
(45) Date of Patent: Jan. 4, 2005

(54) SHOVEL WITH IMPROVED STABILITY AND ROOT CUTTING ABILITY

(76) Inventor: Jerold W. Britt, P.O. Box 1255, West Point, VA (US) 23181

(*) Notice: Subject to any disclaimer, the term of this patent is extended or adjusted under 35 U.S.C. 154(b) by 90 days.

(21) Appl. No.: 10/252,782

(22) Filed: Sep. 23, 2002

(51) Int. Cl.$^7$ ................................................ A01B 1/02
(52) U.S. Cl. ........................................................ 294/49
(58) Field of Search ........................... 294/49, 55, 60, 294/50.7, 51; 30/315; 172/371

(56) References Cited

U.S. PATENT DOCUMENTS

| | | | | |
|---|---|---|---|---|
| 298,926 A | * | 5/1884 | Watson | 172/381 |
| 557,380 A | * | 3/1896 | Gordon | 294/49 |
| 809,840 A | * | 1/1906 | Peisker | 294/49 |
| 856,575 A | * | 6/1907 | Elliott | 294/49 |
| D332,555 S | * | 1/1993 | Hagerman | D8/10 |
| 5,533,578 A | | 7/1996 | Powell | |
| 5,669,649 A | * | 9/1997 | Metcalf | 294/57 |
| 6,338,511 B1 | | 1/2002 | Douglas et al. | |

* cited by examiner

*Primary Examiner*—Dean J. Kramer

(57) ABSTRACT

A novel shovel combining a curved blade with a flat front edge beveled on the back side to improve stability and soil penetration and root-cutting ability. The flat front edge greatly reduces the tendency of the shovel to roll from side to side in the user's hands, thereby providing stability when digging into hard or packed soil. The beveled surface on the back side of the front edge increases the soil penetration ability and further enhances the shovel's ability to slice into hard or packed soils. Root-cutting ability is greatly improved by the combination of the flat and beveled front edge. As compared to prior art pointed shovels, the flat front edge greatly increases the likelihood of contacting a root squarely with a cutting edge.

18 Claims, 5 Drawing Sheets

SHOVEL WITH IMPROVED STABILITY AND ROOT CUTTING ABILITY

FIELD OF THE INVENTION

The present invention relates to manual shovels and more particularly to a shovel having improved stability, better root cutting ability, and improved soil penetrating ability. When used by an operator, the shovel of the present invention has a decreased tendency to roll from side to side, making it more stable than prior art shovels and thereby reducing the chance of injuring the user's ankles, knees, or back. The shovel blade's geometry increases its cutting ability through soil, grass, roots, and other typical surface and subsurface objects.

BACKGROUND OF THE INVENTION

Although many well known examples of soil-removal shovels exist in the prior art, construction workers and homeowners typically use what is typically referred to as a "contractor's shovel". The typical contractor's shovel is readily obtainable in any hardware retail establishment, and consists of a curved metal blade with a sharp point. By providing a concave side to the blade, the soil-carrying ability of the blade is improved over shovels with flat blades. Soil is less likely to fall off of the curved blade than a flat blade. The lower or ground-contacting portion of the blade includes a sharp point that is intended to provide a single point to improve entry of the blade into the soil. The edge of the blade is typically of a thickness equal to the thickness of the remainder of the blade.

Although the typical contractor's shovel described above provides an adequate means of penetrating soil that is soft or sandy, it is inadequate for penetrating hard or packed soils or even moderately hard soils that are covered by grass or other ground coverings. In these situations, as an operator places the point of the shovel against a hard soil surface, places one foot against a foot-engagement surface opposite the cutting edge, and applies force against the foot-engagement surface, the shovel, by virtue of the sharp point, tends to roll from side to side as the point resists penetration into the hard soil. By applying additional force to overcome the resistance of the hard soil, the operator risks ankle, knee, or other leg or back injuries from the large sideways torque caused by the point, the curved sides of the blade, and the excessive force required to break the soil surface.

Leg or back injuries may also occur when using the standard contractor's shovel in any soil, if, for example, the cutting edge of the shovel contacts a root or similar subsurface object. By virtue of the pointed blade and curved sides adjacent the point, a root most likely will be contacted off-center or away from the point. Root contact on the curved cutting edge tends to throw the shovel sideways, in a direction opposite the curved edge contacting the root. The suddenness of impact of the unexpected object with the blade can cause a sudden sideways jerk that can cause injury to the operator's ankle, knee, hip, back, or other areas of the body.

There are several examples in the prior art for improving the stability and root-cutting ability of shovels. These include U.S. Pat. No. 5,533,578 to Powell and U.S. Pat. No. 6,338,511 to Douglas, et al.

U.S. Pat. No. 5,533,578 (hereinafter the '578 patent) describes a two-pointed shovel that includes a bifurcated cutting edge consisting of a pair of prongs. The prongs form an indentation of shallow depth with a cutting edge lining the indentation. The indentation and cutting edge are provided to straddle a subsurface root and cut it.

Although the shovel of the '578 patent provides an indentation for cutting roots, it still is less than optimal for minimizing sideways torque. For the indentation to properly cut a root, the root must be of the proper size to fit the indentation and the indentation must center on the root. Unfortunately, not all roots are of the same size, and therefore some roots may be oversized and not fit within the indentation. The oversized root may then become jammed between the pair of prongs, trapping the shovel in the ground and making it hard to extract. Since the indentation area of the blade is a relatively small part of the front edge of the blade, roots may just as easily contact the curved sides of the blade as the indented part, thereby rendering the indentation useless. Additionally, the shovel of the '578 patent, although bifurcated into two prongs, still includes two pointed prongs and sharply curved sides, therefore causing an undesirable strong sideways force on the handle when placed against hard soil with force applied thereto.

U.S. Pat. No. 6,338,511 (hereinafter the '511 patent) describes a shovel including an elongated root-cutting blade including a sharpened root-cutting edge located substantially along the longitudinal centerline of the blade and a pair of side blades projecting from the sides of the blade. Forward facing cutting edges are included on the forward ends of the side blades. The shovel of the '511 patent, although providing three extra root cutting surfaces, is not ideal for penetrating hard soils as a result of the increased friction provided by the extra shovel surface area. The three root cutting surfaces add a significant amount of drag or resistance to the shovel. The additional metal needed to create the three additional root-cutting surfaces would also add significantly to the production cost of the shovel. Although providing three additional root-cutting surfaces, there is no guarantee that roots will be encountered in the proper orientation to contact these surfaces. The shovel of the '511 patent may, in fact, encounter a root perpendicular to and centered on the lower blade of the shovel. In this situation, the lower blade would begin to cut the root and as it progressed through the root the elongated center root-cutting blade would push longitudinally into the root, thereby forcing two cutting blades into the root at once and dramatically increasing resistance to forward advance of the blade.

Accordingly, an improved shovel is needed to provide better stability, improved root cutting ability, and enhanced soil penetrating ability without adding significantly to the overall shovel surface area and thereby increasing resistance with the soil.

OBJECTS OF THE INVENTION

The shovel of the present invention provides increased stability over prior art shovels. The tendency for the shovel blade to cause the shovel to roll from side to side is greatly decreased. As a result, the improved shovel of the present invention greatly reduces the chance of injury to the user's ankles, knees, or back.

Another advantage provided by the shovel of the present invention is an improved soil penetrating ability. The design features of the shovel enhance the soil penetration ability, making the shovel particularly useful for penetrating hard or packed soils.

A further advantage provided by the shovel of the present invention is a greatly improved the root-cutting ability. The cutting edge is more likely to squarely encounter the root and the edge includes an enhanced root-cutting ability.

Additionally, the shovel provides the above advantages without adding to the cost of production of the shovel, and, in fact, by removing the additional metal required to form the point, is cheaper to produce than standard prior art pointed shovels.

These, and other advantages, will become readily apparent to one of skill in the art having regard for the following disclosure.

BRIEF DESCRIPTION OF THE INVENTION

The present invention provides a novel shovel that combines a curved blade with a flat forward edge to stabilize the shovel during use. By eliminating the point from the forward edge of the shovel and adding a flat forward edge, the shovel resists the tendency to roll from side to side in the user's hands, thereby providing stability when performing the first cut into hard or packed soil.

A further feature of the present invention is to provide a shovel that has an improved soil penetrating ability. This feature includes a beveled forward edge that increases the soil penetration ability, enhancing the shovel's ability to slice into hard or packed soils.

The combination of the flat and beveled forward edge provide a greatly improved the root-cutting ability. The flat forward edge greatly increases the likelihood of contacting a root with a cutting edge. The beveled edge greatly increases the root-cutting ability of the forward edge.

REFERENCE NUMERALS USED IN THE SPECIFICATION AND DRAWINGS

20—shovel
22—blade
24—upper end
26—lower end
28—side
30—centerpoint
32—longitudinal axis
34—lateral axis
36—straight portion of side
38—tapered portion of side
40—flat forward edge
41—top edge
42—handle receptacle
44—handle
46—rivet
48—concave front surface
50—convex back surface
52—raised area
54—plane connecting sides at straight side portions
58—rim
60—beveled portion 100—prior art shovel
102—operator
104—rim (prior art shovel)
106—point (prior art shovel)
108—blade (prior art shovel)
110—ground

DETAILED DESCRIPTION

As this invention may be more easily explained by reference to the attached drawings, it should be noted that the figures are representative and exemplary of the invention only, and should not be construed as limiting the scope of the invention in any way.

The present invention is a shovel that provides improved stability, better cutting ability in hard or packed soils, better root-cutting ability, and less chance of injury to the user's ankles, knees, and back.

Figure 1:
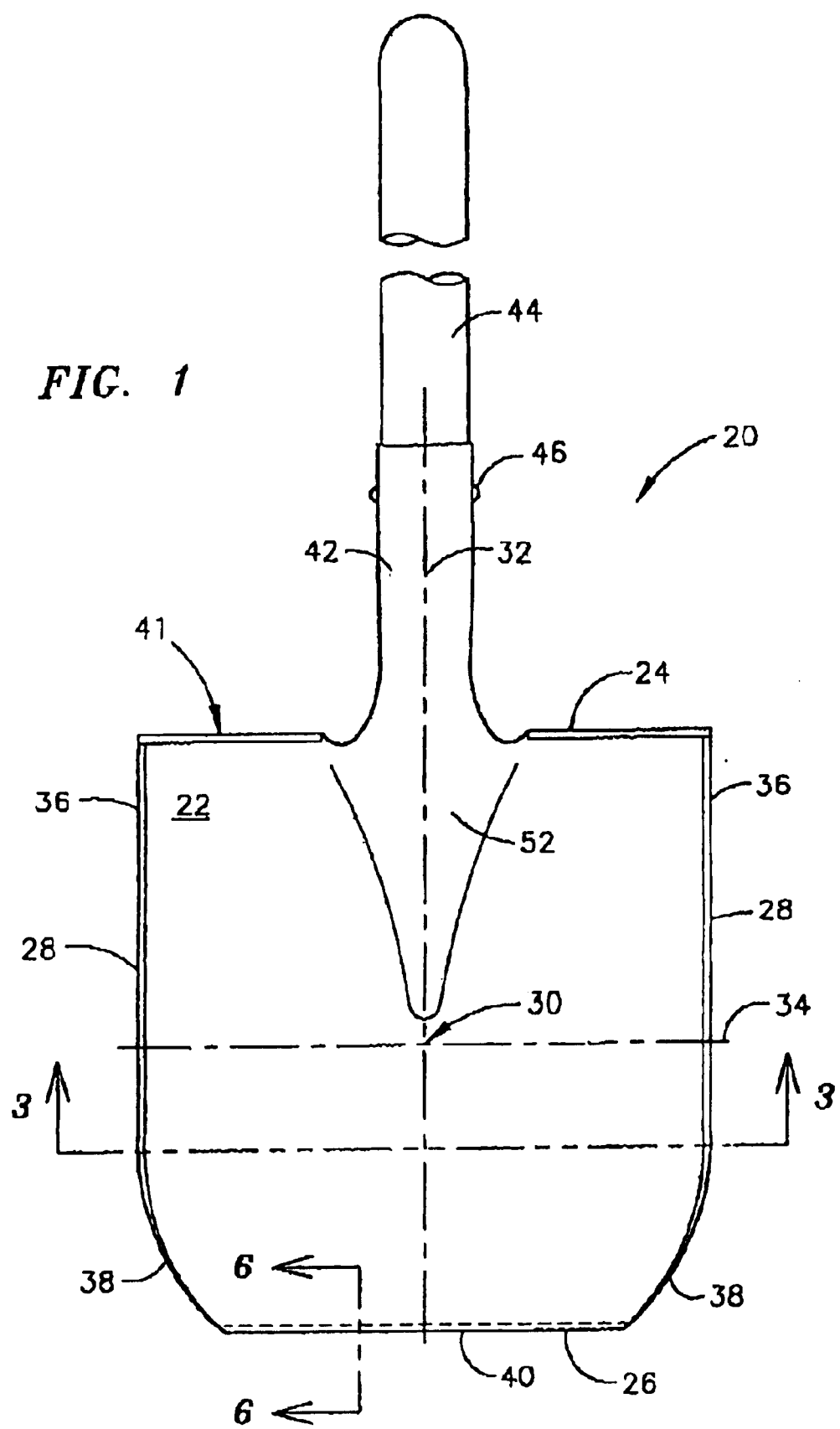
FIG. 1 is an elevation view of a preferred embodiment of the shovel of the present invention.

Referring to FIG. 1, an elevation view is shown of a preferred embodiment of the shovel 20 with a blade 22 including an upper end 24, lower end 26, and two flangeless sides 28. The blade 22 includes a centerpoint 30 that is indicated at the intersection of a longitudinal axis 32 shown in phantom lines vertically through the blade 22 and a lateral axis 34 shown in phantom lines horizontally through the blade 22. The sides 28 include substantially straight and parallel portions 36 at the upper end 24 of the blade 22 and include a tapered portion 38 that is tapered inward at the lower end 26. A flat forward edge 40 extends substantially across the lower end 26 of the blade 22. By describing the forward edge 40 as flat, it should be pointed out that the forward edge 40 is flat or parallel to the top edge 41 at the upper end 24 of the blade 22. The blade 22 includes a handle receptacle 42 centered between the sides 28 on the upper end 24. A handle 44 (a portion of which is shown) is fastened to the handle receptacle 42 by a rivet 46 or other similar fastening means.

Figure 2:
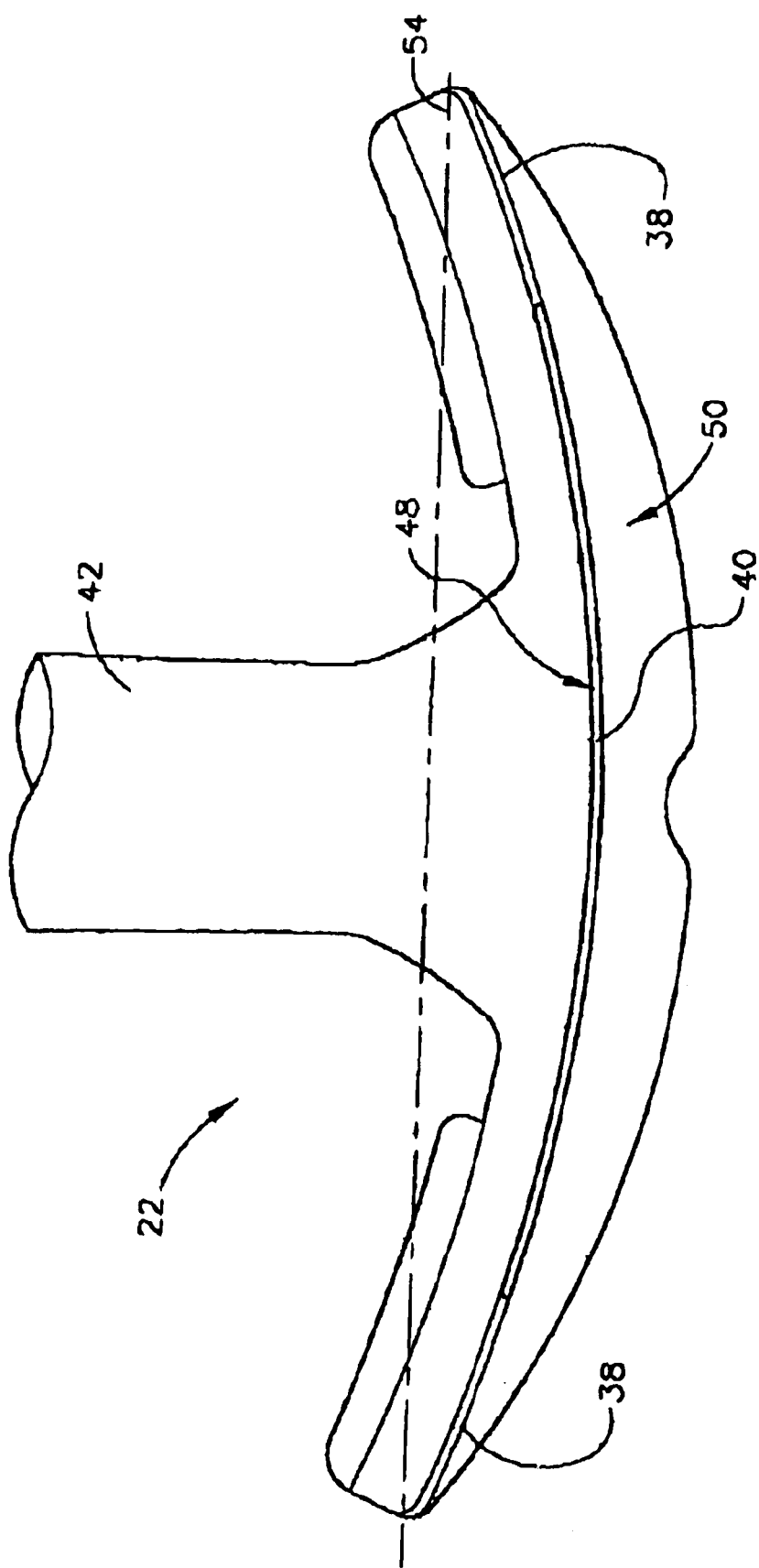
FIG. 2 is an end view of the blade of the shovel from the front edge of the shovel or from the bottom side of FIG. 1.

Referring now to FIGS. 1 and 2, the blade 22 of the shovel 20 is curved laterally to form a smooth concave face surface 48 and a convex back surface 50. By providing the blade with a lateral curve, the soil holding capacity of the concave face 48 is improved and the soil-shedding ability of the convex back is improved. Additionally, in another preferred embodiment, the blade 22 may be curved both laterally (along axis 34 of FIG. 1) and longitudinally (along axis 32 of FIG. 1) to provide a shallow bowl-shaped face for enhanced soil holding capacity. The handle receptacle 42 includes a raised area 52 along the central axis that stiffens the blade 22 and forms the lower portion of the handle receptacle 42.

The amount of lateral curve at the forward edge 40 of the concave face surface 48 may be defined as the offset from a plane 54 extending from side to side of the straight side portions 36 of the blade 22. As shown in FIG. 2, the concave face surface 48 at the forward edge 40 is curved between 0.95 and 1.45 inches from the plane 54 connecting the tapered side portions 38. Most preferably, the concave face is curved 1.20 inches from the plane 54 connecting the straight side portions 36.

Figure 3:
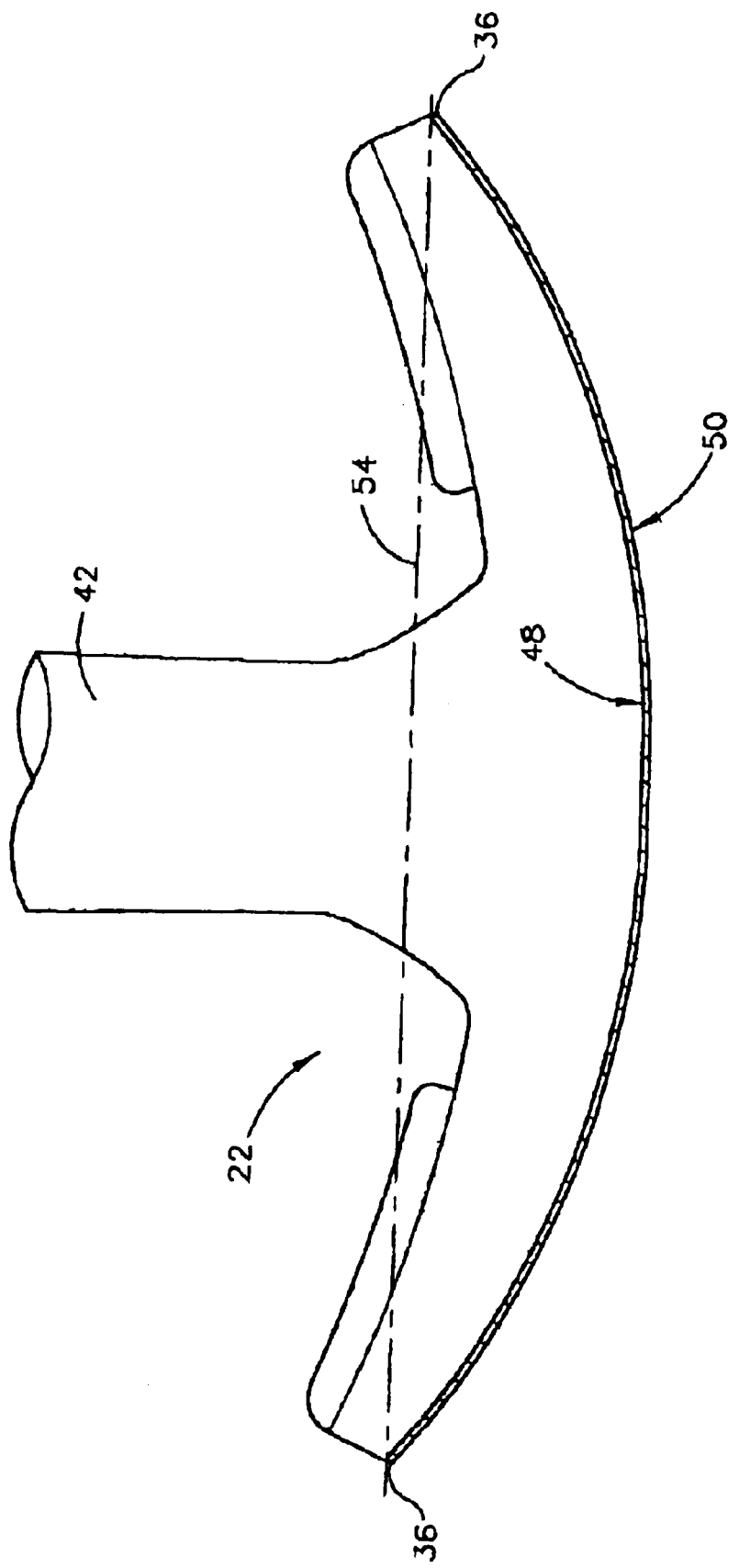
FIG. 3 is a sectional view of the blade of the shovel taken along line 3—3 of FIG. 1.

Referring to FIG. 3, the amount of lateral curve in the concave face surface 48 at the centerpoint 30 may be defined as the offset from a plane 54 extending from side to side of the straight side portions 36 of the blade 22. As shown in FIG. 3, at the centerpoint 30, the concave face surface 48 is curved between 1.1 and 1.6 inches from the plane 54 connecting the straight side portions 36. Most preferably, at the centerpoint 30 the concave face is curved 1.35 inches from the plane 54 connecting the straight side portions 36.

Figure 4:
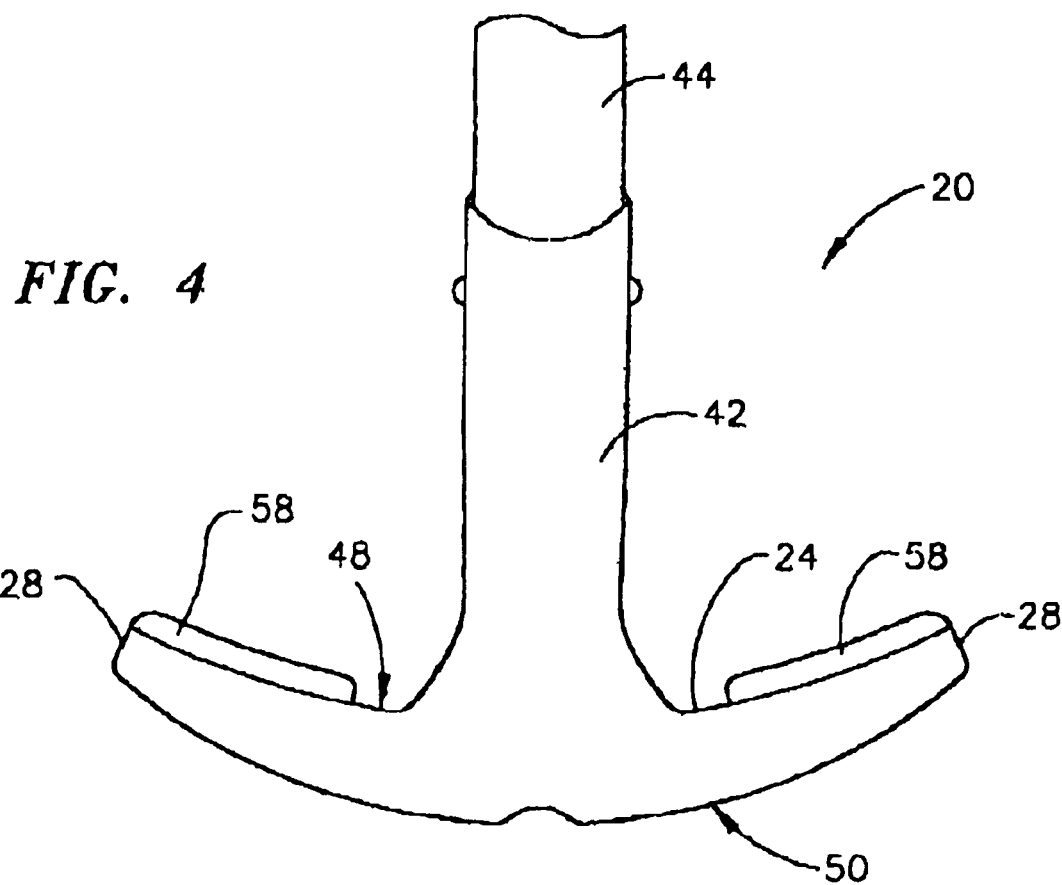
FIG. 4 is a top view of the shovel or from the top side of FIG. 1.

Referring to the top view of the shovel 20 in FIG. 4, the upper end 24 preferably includes integral rims 58 extending toward the concave face surface 48 of the blade 22. The rims 58 provide a foot rest area to support a user's foot. One rim 58 is located on each side 28 of the upper end 24.

Figure 5:
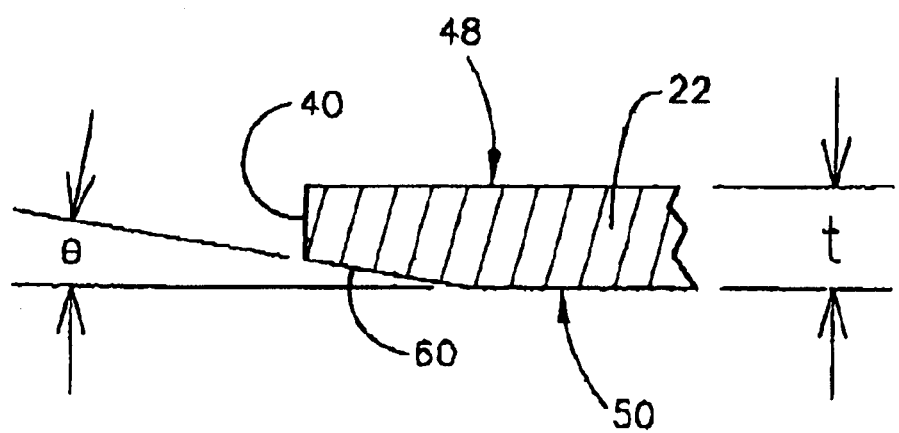
FIG. 5 is a sectional view of the front edge of the shovel taken along line 6—6 of FIG. 1.

Referring now to FIG. 5, a sectional view of the flat forward edge 40 of the shovel taken along line 6—6 of FIG. 1, the convex back surface 50 includes a beveled portion 60 at its juncture with the flat forward edge 40. The beveled portion 60 may be at an angle (θ) between 5 and 15 degrees and most preferably is at 8 degrees as measured with respect to the back surface 50. The thickness (t) of the blade 22 is preferably between 0.050 and 0.080 inches and is most preferably 0.066 inches. Preferably, the depth of the beveled portion 60 is such that between 20 and 30% of the thickness (t) of the blade 22 is removed. Most preferably, the depth of the bevel is 24% of the thickness of the blade 22.

Figure 6:
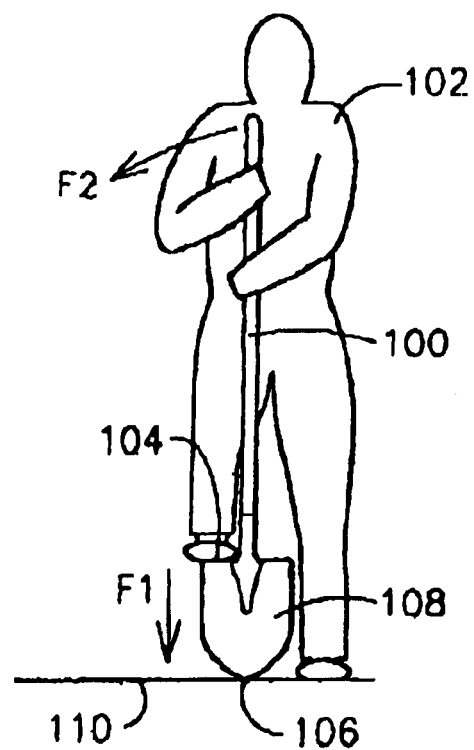
FIG. 6 shows a prior art shovel being used by an operator.

Referring to FIG. 6, an example of a prior art shovel 100 shows an operator 102 applying force F1 to the rim 104 of the shovel. The prior art shovel includes a point 106 at the forward end of the blade 108. In those situations where the ground 110 is hard or packed, a sideways force F2 is transmitted through the handle. The sideways force F2 tends to make the shovel tip or roll from side to side, in the direction of the arrow F2.

Figure 7:
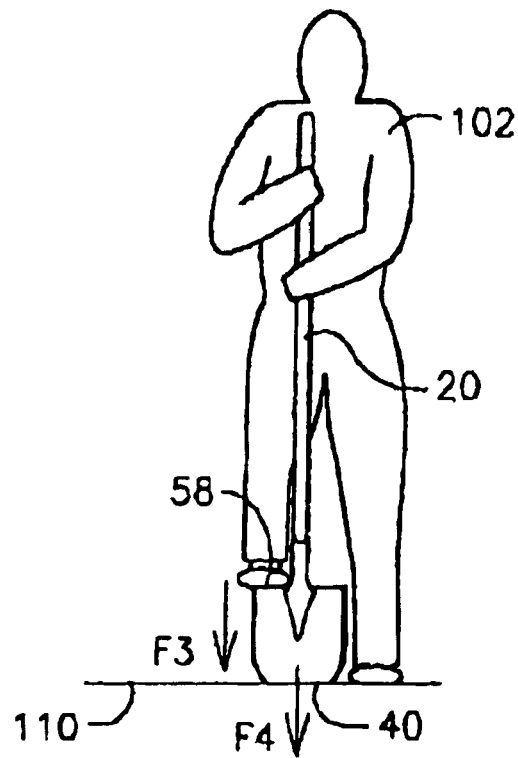
FIG. 7 shows the present invention being used by an operator.

Referring now to FIG. 7, an example is shown of the shovel 20 of the present invention having improved stability and root-cutting ability. In this situation an operator 102 applies a force F3 to the blade 22 of the shovel at the rim 58 and little force is wasted and transmitted to the handle in the form of an unwanted sideways rolling force. By virtue of the flat forward edge 40 and the beveled portion (not shown) of the flat forward edge 40, almost all of the force F3 is transmitted into a downward force F4 on the flat forward edge 40 into the ground 110.

Referring to FIG. 1, the length of the flat forward edge 40 of the preferred embodiment is preferably at least 55% of the width of the blade 22 as compared to the width of the blade 22 at the upper end 24 and is most preferably 70% of the width of the blade 22 at the upper end. For a particularly preferred embodiment having a blade 22 that is 9.0 inches wide at the upper end 24, the flat forward edge 40 is preferably between 5.0 and 7.0 inches long and most preferably 6.25 inches long. The length of the blade 22 of this preferred embodiment would preferably be between 8.0 and 11.0 inches long and most preferably 9.25 inches long.

While the invention has been described by reference to the preferred embodiment described herein, the invention is subject to considerable modification and may be tailored to fit the needs of many suitable mounting needs without departing from the scope or spirit of the claims which are appended hereto.

What is claimed is:

1. A shovel for improved stability and increased cutting ability, comprising:
    a blade of substantially uniform thickness having an upper end, a lower end, two flangeless sides, and a centerpoint defined as the intersection of a longitudinal axis centered between said sides and a lateral axis centered between said ends;
    said blade curved laterally at a constant rate of curvature between said sides to form a concave smooth face surface and a convex back surface, said lateral curvature extending from said upper end to said lower end of said blade;
    said sides substantially straight and parallel at said upper end and continually tapering inwards at said lower end;
    said lower end having a flat forward edge;
    said flat forward edge is between 65 and 80 percent of the maximum width of said blade at said upper end;
    a handle receptacle on said blade centered between said sides on said upper end;
    a handle rigidly secured to said handle receptacle; and
    a fastening arrangement securing said handle to said handle receptacle.

2. The shovel for improved stability and increased cutting ability of claim 1 wherein said convex back surface includes a beveled portion at said forward edge.

3. The shovel for improved stability and increased cutting ability of claim 2 wherein said beveled portion removes between 20 and 30% of the thickness of said blade.

4. The shovel for improved stability and increased cutting ability of claim 3 wherein said beveled portion is at an angle of between 5 and 15 degrees with respect to said back surface.

5. The shovel for improved stability and increased cutting ability of claim 3 wherein said beveled portion is at an angle of 8 degrees with respect to said back surface.

6. The shovel for improved stability and increased cutting ability of claim 2 wherein said beveled portion removes 24% of the thickness of said blade.

7. The shovel for improved stability and increased cutting ability of claim 1 wherein said concave face surface is curved between 1.1 and 1.6 inches from a plane connecting said sides at said upper end.

8. The shovel for improved stability and increased cutting ability of claim 1 wherein said concave face surface is curved 1.35 inches from a plane connecting said sides at said upper end.

9. The shovel for improved stability and increased cutting ability of claim 1 wherein said concave face surface at said forward edge is curved between 0.95 and 1.45 inches from a plane connecting said sides at said upper end.

10. The shovel for improved stability and increased cutting ability of claim 1 wherein said concave face surface at said forward edge is curved 1.20 inches from a plane connecting said sides at said upper end.

11. The shovel for improved stability and increased cutting ability of claim 1 wherein said flat forward edge is 70 percent of the maximum width of said blade at said upper end.

12. The shovel for improved stability and increased cutting ability of claim 1 wherein said upper end includes a rim extending toward said concave face surface, said rim providing a foot rest.

13. The shovel for improved stability and increased cutting ability of claim 1 wherein said blade is 9.0 inches wide at said upper end and said flat forward edge is between 5.0 and 7.0 inches wide.

14. The shovel for improved stability and increased cutting ability of claim 1 wherein said blade is 9.0 inches wide at said upper end and said flat forward edge is 6.25 inches wide.

15. The shovel for improved stability and increased cutting ability of claim 1 wherein said blade is between 8.0 and 11.0 inches long as measured along said longitudinal axis.

16. The shovel for improved stability and increased cutting ability of claim 1 wherein said blade is 9.25 inches long as measured along said longitudinal axis.

17. The shovel for improved stability and increased cutting ability of claim 1 wherein said thickness of said blade is between 0.050 and 0.080 inches.

18. The shovel for improved stability and increased cutting ability of claim 1 wherein said thickness of said blade is 0.066 inches.

* * * * *